US005700577A

United States Patent [19]

Grace et al.

[11] Patent Number: 5,700,577

[45] Date of Patent: Dec. 23, 1997

[54] MOLECULAR GRAFTING TO ENERGETICALLY TREATED POLYESTERS TO PROMOTE ADHESION OF GELATIN-CONTAINING LAYERS

[75] Inventors: Jeremy Grace, Rochester; Louis J. Gerenser, Webster; Janglin Chen, Rochester; Edgar E. Riecke, Pittsford, all of N.Y.

[73] Assignee: Eastman Kodak Company, Rochester, N.Y.

[21] Appl. No.: 638,900

[22] Filed: Apr. 24, 1996

Related U.S. Application Data

[62] Division of Ser. No. 415,826, Apr. 3, 1995, Pat. No. 5,563, 029.

[51] Int. Cl.[6] ..................... B32B 7/04

[52] U.S. Cl. ..................... 422/420; 428/480; 430/532; 430/533

[58] Field of Search ..................... 428/420, 480; 430/532, 533

[56] References Cited

U.S. PATENT DOCUMENTS

| | | | |
|---|---|---|---|
| 3,761,299 | 9/1973 | Lidel | 430/533 |
| 3,833,403 | 9/1974 | Kogure et al. | 117/47 |
| 4,181,528 | 1/1980 | Work, III et al. | 430/532 |
| 4,241,169 | 12/1980 | Work, III et al. | 430/532 |
| 4,252,885 | 2/1981 | McGrail et al. | 430/532 |
| 4,304,851 | 12/1981 | McGrail et al. | 430/532 |
| 4,476,218 | 10/1984 | Ogawa et al. | 430/539 |
| 4,481,284 | 11/1984 | Ogawa et al. | 430/355 |
| 4,485,024 | 11/1984 | Furumura et al. | 252/62.56 |
| 4,533,623 | 8/1985 | Urata et al. | 430/309 |
| 4,689,359 | 8/1987 | Ponticello et al. | 524/23 |
| 4,695,532 | 9/1987 | Ponticello et al. | 430/533 |
| 4,897,344 | 1/1990 | Okamura et al. | 430/622 |
| 4,999,275 | 3/1991 | Kasama et al. | 430/264 |
| 5,316,902 | 5/1994 | Pecht et al. | 430/935 |
| 5,348,772 | 9/1994 | Demuth et al. | 427/536 |

FOREIGN PATENT DOCUMENTS

| | | | |
|---|---|---|---|
| 115351 | 8/1984 | European Pat. Off. . | |
| 119761 | 9/1984 | European Pat. Off. . | |
| 143436 | 6/1985 | European Pat. Off. . | |
| 0 206 669 | 12/1986 | European Pat. Off. | C09J 5/02 |
| 245090 | 11/1987 | European Pat. Off. . | |
| 282865B1 | 9/1988 | European Pat. Off. . | |
| 2051930 | 6/1971 | Germany | 430/533 |
| 2106262 | 4/1983 | United Kingdom . | |

*Primary Examiner*—Christopher Raimund
*Attorney, Agent, or Firm*—Arthur H. Rosenstein

[57] ABSTRACT

The present invention is a biaxially oriented polyester film support in which the surface has been subjected to an energetic treatment to produce amine groups on the polyester surface. The treated surface is then coated with a dilute amine reactive hardener solution. After drying the hardener solution a photographic emulsion is coated to the surface. The resulting film element has better adhesion of the photographic emulsion after photoprocessing than previous known methods.

4 Claims, 1 Drawing Sheet

MOLECULAR GRAFTING TO ENERGETICALLY TREATED POLYESTERS TO PROMOTE ADHESION OF GELATIN-CONTAINING LAYERS

This is a Divisional of application Ser. No. 08/415,826, filed 3 Apr. 1995, now U.S. Pat. No. 5,563,029.

FIELD OF THE INVENTION

The present invention relates to the manufacture of photosensitive materials. More specifically, the present invention is polyester material which has been subjected to energetic treatment and a thin layer of amine reactive hardener grafted thereon.

BACKGROUND OF THE INVENTION

Conventional subbing chemistry has not proven totally effective on biaxially oriented polyester support, and thus, there is a problem of adhesion in the photoprocessor environment of aqueous coats of photograpic emulsions to these highly inert polymer surfaces. Recent approaches to overcoming the challenges of subbing biaxially oriented polyester support have involved plasma treatments, UV treatments, and other surface modification techniques often combined with heating the support material and/or complicated subbing chemistry. Recent advances in subbing technology have shown promise for replacing a U-coat/gelatin sub system with a single subbing layer applied to a plasma treated biaxially oriented polyester support. This is described in more detail in U.S. Ser. No. 08/199,416, filed Feb. 22, 1994 entitled "Use of Glow Discharge Treatment to Promote Adhesion of Aqueous Coats to Substrate".

As described in U.S. Pat. No. 5,425,980, it has been shown that photographic emulsions may adhere to plasma treated support using gelatin sub and no U-coat, a single subbing layer containing a terpolymer and gelatin (as described in U.S. Pat. Nos. 4,695,532 and 4,689,359), or no subbing at all. The plasma treatment technology has enabled the coating of emulsions and gelatin based subbing layers directly onto biaxially oriented polyesters.

In particular, the single subbing layer has shown a wide plasma treatment latitude for obtaining acceptable wet adhesion of emulsion to support. A problem with the single-sub layer, however, has been that the adhesive strength of the emulsion package is somewhat reduced after exposure to photoprocessing chemistry. Alternative approaches involving a gelatin sub and plasma treatment have shown appreciably less latitude than the single-sub chemistry affords. Thus, there is a need to provide a simple and effective process for achieving good wet adhesion of emulsion to biaxially oriented polyester support without sacrificing dry adhesive strength after photoprocessing.

The present invention provides a novel combination of energetic treatment and molecular grafting of amine reactive hardener to a surface of a biaxially oriented polyester support which improves wet adhesion and, in addition, does not lose strength after photoprocessing.

SUMMARY OF THE INVENTION

The present invention is a method of coating a polyester support which includes passing a surface of the polyester support through an energetic treatment. The surface of the polyester support is then coated with an amine reactive hardener solution. The amine reactive hardener solution is then dried. The surface of the support is then coated with a photographic emulsion.

In a preferred embodiment of the present invention the hardener is selected from the group consisting of 1,2-bis(vinylsulfonylacetamido)ethane (BVSAE), bis(vinylsulfonyl)methane (BVSM), bis(vinylsulfonylmethyl) ether (BVSME) or bis(vinylsulfonylethyl)ether (BVSEE), 1,3-bis(vinylsulfonyl)propane (BVSP), 1,3-bis(vinylsulfonyl)-2-hydroxypropane(BVSHP), 1,1-bis(vinylsulfonyl)ethylbenzenesulfonate sodium salt, 1,1,1-tris(vinylsulfonyl)ethane (TVSE), tetrakis(vinylsulfonyl)methane, tris(acrylamido)hexahydro-s-triazine, copoly(acroleinmethacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function such a halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens.

The present invention also includes a film element which comprises a polyester support having a surface which has been exposed to an energetic treatment. A coating of amine reactive hardener which is selected from the group consisting of 1,2-bis(vinylsulfonylacetamido)ethane (BVSAE), bis(vinylsulfonyl)methane (BVSM), bis(vinylsulfonylmethyl) ether (BVSME) or bis(vinylsulfonylethyl)ether (BVSEE), 1,3-bis(vinylsulfonyl)propane (BVSP), 1,3-bis(vinylsulfonyl)-2-hydroxypropane(BVSHP), 1,1-bis(vinylsulfonyl)ethylbenzenesulfonate sodium salt, 1,1,1-tris(vinylsulfonyl)ethane (TVSE), tetrakis(vinylsulfonyl)methane, tris(acrylamido)hexahydro-s-triazine, copoly(acroleinmethacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function such a halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens is grafted to the surface of the polyester support. Finally, a photographic emulsion is applied to the treated and coated, surface of the polyester support.

Figure 1:
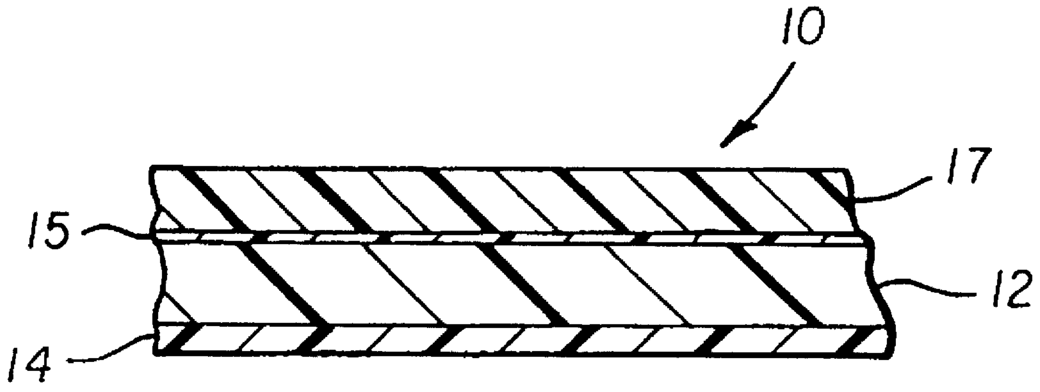
FIG. 1 shows a film element of the present invention.

For a better understanding of the present invention together with other objects, advantages and capabilities thereof, reference is made to the following description and appended claims in connection with the above described drawing.

DESCRIPTION OF THE PREFERRED EMBODIMENT

Traditional subbing technology represents an adhesive layer approach to solving an interfacial adhesion problem. In short, some layer or pair of layers is coated onto a polyester base material, typically polyethylene naphthalate (PEN) or polyethylene terephthalate (PET), in order to create a surface to which the desired functional layers (e.g., photographic emulsions) will adhere. Generally, the interaction of the subbing layers with the polyester or functional layers can be rather complex, and success hinges on the ability of the aqueous subbing layer to penetrate the polyester surface. In contrast, by appropriately bonding hardener molecules directly to an energetically treated surface, it is possible to create a very thin layer that can interact readily with the coated photographic emulsion layer to produce excellent adhesion. Typical energetic treatment includes electrical discharge treatment, UV treatment, plasma treatment, electron-beam treatment, laser treatment, corona treatment and glow discharge treatment. The present invention includes exposing a web of polyester base material to an energetic treatment that produces amine groups on the surface of the polyester base material, coating the treated base material with a dilute solution of hardener and appropriate solvent (e.g. water, or organic solvent), and drying the hardener solution. The hardener coated web is then ready for emulsion coating. The preferred hardeners include amine reactive hardeners (e.g., 1,2-bis(vinylsulfonylacetamido) ethane (BVSAE), bis(vinylsulfonyl)methane (BVSM), bis (vinylsulfonylmethyl)ether (BVSME) or bis (vinylsulfonylethyl)ether (BVSEE), 1,3-bis(vinylsulfonyl) propane (BVSP), 1,3-bis(vinylsulfonyl)-2-hydroxypropane (BVSHP), 1,1-bis(vinylsulfonyl)ethylbenzenesulfonate sodium salt, 1,1,1-tris(vinylsulfonyl)ethane (TVSE), tetrakis (vinylsulfonyl)methane, tris(acrylamido)hexahydro-s-triazine, copoly(acrolein-methacrylic acid), glycidyl ethers, acrylamides, dialdehydes, blocked dialdehydes, α-diketones, active esters, sulfonate esters, active halogen compounds, s-triazines, diazines, epoxides, formaldehydes, formaldehyde condensation products, anhydrides, aziridines, active olefins, blocked active olefins, mixed function such a halogen-substituted aldehyde acids, vinyl sulfones containing other hardening functional groups, polymeric hardeners such as polymeric aldehydes, polymeric vinylsulfones, polymeric blocked vinyl sulfones and polymeric active halogens.

The examples discussed below are for plasma treated PEN (polyethylene naphthalate) coated with a dilute solution of bis(vinylsulfonyl)methane (BVSM) in water and then coated with a photographic emulsion pack.

The nitrogen plasma treatments were carried out using two coplanar electrodes housed in a vacuum chamber. A controlled nitrogen pressure was established in the electrode region of the chamber, and a high voltage was applied across the electrodes using a 40 kHz supply. The web was conveyed through the resulting nitrogen plasma and was then wound onto a take-up spindle. The treated roll of material was then removed from the chamber and was coated with the water/hardener solution. The aqueous coated web was then conveyed through a drying region and wound onto a take-up spindle. A simulated emulsion pack was then coated onto the plasma treated, hardener coated web.

FIG. 1 shows the film element 10 produced by the process of the present invention. The film element 10 includes a polyester support 12. The polyester support is typically PEN or PET. A backing layer 14 can be included on the backside of the support 12. On the topside of the support 12 is grafted a monolayer 15 of hardener molecules subsequent to nitrogen plasma treatment of the support. A photographic emulsion layer 17 adheres to the monolayer 15. The present invention also includes the polyester support having a monolayer of hardener molecules grafted to the support.

For typical plasma conditions, pressures may be in the range of 0.02 to 2 Torr and plasma powers and web speeds may be set to deliver from about 0.1 to 4.0 J/cm$^2$. In the examples presented below, the nitrogen pressure was 0.1 Torr; powers ranged from 60 to 600 watts with the web speed at approximately 8.4 cm/s, yielding treatment doses in the range of 0.2 to 2.0 J/cm$^2$. For the hardener/water mixtures, hardener (BVSM) concentrations ranged from 0.001 to 0.1% by weight. The hardener solution was delivered at a wet coverage of approximately 0.26 cc/dm$^2$, resulting in hardener levels of 0.0026 to 0.26 mg/dm$^2$. The web was dried at 93° C. for 6 minutes as it passed through the coating apparatus.

The plasma treated BVSM coated web was then coated with a representative emulsion that simulates a full emulsion package. Samples were taken from this roll and incubated for 24 hours at 32° C. and 50% (32/50) relative humidity. An additional set of samples was kept at 21° C. and 50% (21/50) relative humidity for 10 days.

Both sets of samples were tested for wet adhesion in the presence of photoprocessing chemicals, using a wet abrasion test in Process C-41 (Kodak Flexicolor®) developer. In this wet abrasion test, a rubber pad 3 cm in diameter is weighted with 900 grams and rubbed back and forth across a scribe line in the emulsion. The rubbing is done for 100 cycles in the presence of the developer solution.

In addition to the wet adhesion tests, dry peel-force tests were run on 32/50 incubated samples after they were processed in the developer solution. A peel test was carried out by affixing pressure sensitive tape to an emulsion sample and scribing along the edges of the tape. Once a peel was initiated, the force required to continue the peel was measured. Three samples for each run were peeled. In most cases, a peel could not be initiated for any of the three samples per run. In one case (see Table I) one sample peeled with a measurable force, a second sample did not peel, and a third sample exhibited partial peeling. The asterisks in the Post-Process Peel Force Column of Table I indicate that the post-process adhesion was sufficiently good that a peel could not be initiated for any of the three samples tested for that run.

As can be seen from Table I, the hardener concentration and the plasma power can be adjusted to give excellent adhesion between the emulsion and polyester support. In particular, the highest concentration of BVSM used (0.1%) shows a wide latitude for nitrogen plasma treatment. Alternatively, the highest treatment power (600 watts) shows considerable latitude for hardener concentration. Additionally, these samples show little sensitivity to sample incubation or keeping conditions, whereas earlier work with similar nitrogen plasma conditions and no BVSM grafting showed high sensitivity to keeping conditions.

TABLE I

| Run | Plasma Power (Watts) | BVSM Concentration (wt. %) | Wet Adhesion 32/50 Keeping (% fail) | Wet Adhesion 21/50 Keeping (% fail) | Post-Process Peel Force (g/cm) |
|---|---|---|---|---|---|
| 1 | 60 | 0.001 | 78 | 96 | * |
| 2 | 330 | 0.001 | 48 | 71 | * |
| 3 | 600 | 0.001 | 94 | 100 | * |
| 4 | 60 | 0.01 | 64 | 89 | * |
| 5 | 330 | 0.01 | 10 | 0 | * |
| 6 | 606 | 0.01 | 3 | 0 | * |
| 7 | 60 | 0.1 | 0 | 0 | 119 |
| 8 | 330 | 0.1 | 0 | 0 | * |
| 9 | 600 | 0.1 | 0 | 0 | * |

The data in Table II provide examples of sensitivity to keeping conditions for runs made by coating the emulsion directly to the glow discharge treated support. In these runs, as in those listed in Table I, the nitrogen pressure was 100 mTorr and the web speed was 8.4 cm/s. In addition to the examples provided in Table II, there were runs made using other treatment powers and web speeds that showed even higher sensitivity to keeping conditions. In particular, coating on some treatment conditions exhibited 0–1% removal in the wet adhesion tests when tested after 10 day keeping at 21° C. and 50% relative humidity, but when the samples from the same coating events were incubated for 24 hours at 32° C. and 50% relative humidity prior to testing, they exhibited 99% removal in the wet adhesion test.

TABLE II

| Run | Plasma Power (Watts) | Wet Adhesion 32/50 Keeping (% Fail) | Wet Adhesion 21/50 Keeping (% Fail) |
|---|---|---|---|
| 10 | 60 | 17 | 0 |
| 11 | 330 | 20 | 0 |
| 12 | 600 | 34 | 0 |

Surface studies using x-ray photoelectron spectroscopy (XPS) reveal that the nitrogen plasma treatment, followed by aqueous coating of BVSM, BVSME or other hardener, results in direct grafting of hardener molecules onto the treated surface. The hardener molecules are chemically bonded to the nitrogen plasma treated polyester surface via interaction between the vinyl groups in the hardener and plasma induced amine groups en the polyester surface. By coating the appropriate concentration of hardener (0.1% by weight) in water or organic solvent, a reasonably close-packed monolayer of hardener molecules can be grafted onto the treated polyester surface. Under these conditions, the majority of the hardener molecules are oriented with the vinyl groups on one end bonded to the treated surface and the vinyl groups on the other end free to bond with the gelatin containing photographic emulsion layer.

Although the present invention has been described in sufficient detail, it does not necessarily represent an optimized scenario. In particular, it may be possible to achieve the desired coverage of hardener (i.e., one monolayer with 50% of the vinyl groups free to bond with the gelatin containing photographic emulsion layer) by different choices for plasma treatment parameters and hardener concentrations. Specifically, an earlier trial of this approach used a higher plasma treatment pressure, a hardener concentration of 0.01% BVSM in water, and an added surfactant (saponin) as a coating aid for the hardener solution. The earlier trial gave excellent wet adhesion results for moderate treatment doses (lower than 330 watts at 8.4 cm/s). Appropriate adjustment of surfactant level and treatment process may result in the desired molecular layer of hardener at significantly lower concentrations than demonstrated in Table 1.

The molecular grafting of hardener to plasma treated polyester demonstrated has several advantages over conventional subbing technology. First, this technique employs a specific and identifiable chemistry between hardener and treated polyester. The chemistry requires a simple surface modification (energetic treatment) and a simple coating (hardener solution) to attain excellent adhesion. In contrast, most conventional subbing chemistry requires a chemically complex subbing layer often followed by a second subbing layer prior to coating photographic emulsions. Furthermore, the success of the conventional subbing formulations generally involves coating unoriented polyester prior to biaxial orientation.

Recent developments have enabled coatings on biaxially oriented polyesters. Using polymer/gelatin blends for single subbing layers has led to good wet adhesion with either a reduced dry adhesive strength of the subbing layer, or a narrow plasma treatment process window for acceptable adhesion. The approach described in the present invention exhibits good wet adhesion with wide process latitude and good dry adhesive strength. In addition, this approach results in adhesive performance that is insensitive to sample incubation conditions where other approaches have shown sensitivity. Because the grafted hardener layer is molecularly thin, this approach does not suffer from problems associated with optical nonuniformities in the subbing layer. Finally, this approach results in a passivated plasma treatment web that should be able to be stored indefinitely prior to emulsion coating. Should a batch process be used, the longevity of the plasma treated, hardener coated surface affords scheduling latitude that does not exist if the plasma treated web is to be directly coated with photographic emulsion.

While there has been shown and described what are at present considered the preferred embodiments of the invention, it will be obvious to those skilled in the art that various alterations and modifications may be made therein without departing from the scope of the invention as defined by the appended claims. All such modifications are intended to be included in the present application.

What is claimed is:

1. A film base comprising:

a polyester substrate having a surface exposed to an energetic treatment producing amine groups on the surface;

a coating of amine reactive hardener selected from the group consisting of 1,2-bis(vinylsulfonylacetamido) ethane, bis(vinylsulfonyl)methane, bis (vinylsulfonylmethyl)ether, bis(vinylsulfonylethyl) ether, 1,3-bis(vinylsulfonyl)propane, 1,3-bis (vinylsulfonyl)-2-hydroxypropane, 1,1-bis (vinylsulfonyl)ethylbenzenesulfonate sodium salt, 1,1,1-tris(vinylsulfonyl)ethane, tetrakis(vinylsulfonyl) methane, tris(acrylamido)hexahydro-s-triazine, copoly (acrolein-methacrylic acid), glycidyl ethers, acrylamides, dialdehydes, blocked dialdehydes, α-diketones, amine-reactive esters, sulfonate esters, amine-reactive halogenated compounds, s-triazines, diazines, epoxides, formaldehydes, formaldehyde condensation products, anhydrides, aziridines, amine-reactive olefins, blocked amine-reactive olefins, polymeric hardeners selected from the group consisting of polymeric aldehydes, polymeric vinylsulfones, polymeric blocked vinyl sulfones and amine-reactive halogenated polymers grafted to the surface.

2. The film base according to claim 1 wherein the substrate comprises polyethylene naphthalate.

3. The film base according to claim 1 wherein the substrate comprises polyethlene terephthalate.

4. The film base according to claim 1 wherein the energetic treatment comprises a nitrogen plasma.

* * * * *